United States Patent
Ogawa et al.

(10) Patent No.: US 10,978,023 B2
(45) Date of Patent: Apr. 13, 2021

(54) DISPLAY APPARATUS FOR VEHICLE

(71) Applicants: DENSO CORPORATION, Kariya (JP); WASEDA UNIVERSITY, Tokyo (JP)

(72) Inventors: Hiroaki Ogawa, Kariya (JP); Katsumi Watanabe, Tokyo (JP)

(73) Assignees: DENSO CORPORATION, Kariya (JP); WASEDA UNIVERSITY, Tokyo (JP)

( * ) Notice: Subject to any disclaimer, the term of this patent is extended or adjusted under 35 U.S.C. 154(b) by 0 days.

(21) Appl. No.: 16/661,309

(22) Filed: Oct. 23, 2019

(65) Prior Publication Data
US 2020/0135145 A1 Apr. 30, 2020

(30) Foreign Application Priority Data
Oct. 25, 2018 (JP) .............................. JP2018-201239

(51) Int. Cl.
*G09G 5/10* (2006.01)
*G02B 27/01* (2006.01)

(52) U.S. Cl.
CPC ............ *G09G 5/10* (2013.01); *G02B 27/0179* (2013.01); *G02B 2027/0181* (2013.01); *G09G 2360/16* (2013.01); *G09G 2380/10* (2013.01)

(58) Field of Classification Search
CPC ........ G02B 27/0179; G02B 2027/0181; G09G 5/10; G09G 2360/16; G09G 2380/10
USPC ......................................................... 345/589
See application file for complete search history.

(56) References Cited

U.S. PATENT DOCUMENTS

| | | | |
|---|---|---|---|
| 2010/0066925 A1* | 3/2010 | Nagahara | G02B 27/0101 349/11 |
| 2017/0011709 A1 | 1/2017 | Kuwabara et al. | |
| 2017/0084056 A1 | 3/2017 | Masuya et al. | |
| 2018/0211635 A1* | 7/2018 | Ishibashi | G02B 27/0101 |

(Continued)

FOREIGN PATENT DOCUMENTS

| | | |
|---|---|---|
| JP | H05338466 A | 12/1993 |
| JP | 2004-351943 A | 12/2004 |

(Continued)

OTHER PUBLICATIONS

Cochrane, Sally. The Munsell Color System: A Scientific Compromise from the World of Art. Studies in History and Philosophy of Science 47. 2014. pp. 26-41.*

*Primary Examiner* — Jacinta M Crawford
(74) *Attorney, Agent, or Firm* — Maschoff Brennan

(57) ABSTRACT

In a display apparatus, a projected member is arranged in a direction in which a driver of a moving body looks while driving, from the perspective of the driver. A projecting unit projects at least one display object in a position that overlaps a background that is visible to the driver through the projected member, so as to be displayed in a superimposed manner as a virtual image. A measuring unit measures a luminance value of the background. A control unit determines a luminance value of the display object based on the luminance value of the background measured by the measuring unit, chromaticity values of the display object, and a sense of superimposition that is a value having a range of 0 or greater and 100 or less, and controls the projecting unit such that the display object is projected at the luminance value of the display object.

10 Claims, 4 Drawing Sheets

(56) References Cited

U.S. PATENT DOCUMENTS

2018/0373027 A1* 12/2018 Higuchi ................ H04N 9/643
2019/0004313 A1* 1/2019 Kusafuka ............... G02B 27/01

FOREIGN PATENT DOCUMENTS

| JP | 2006-036166 A | 2/2006 |
| JP | 2015-221651 A | 12/2015 |
| WO | 2015/136874 A | 9/2015 |

* cited by examiner

DISPLAY APPARATUS FOR VEHICLE

CROSS-REFERENCE TO RELATED APPLICATION

This application is based on and claims the benefit of priority from Japanese Patent Application No. 2018-201239, filed Oct. 25, 2018. The entire disclosure of the above application is incorporated herein by reference.

BACKGROUND

Technical Field

The present disclosure relates to a display apparatus.

Related Art

A following technology has been proposed regarding a display apparatus that is capable of being used as a head-up display (HUD) for a vehicle. In this technology, visibility of a display object is made favorable by display luminance being changed so as to depend on changes in peripheral illumination.

SUMMARY

The present disclosure provides a display apparatus that includes a projected member, a projecting unit, a measuring unit, and a control unit. The projected member is arranged in a direction in which a driver of a moving body looks while driving, from the perspective of the driver. The projecting unit projects at least one display object in a position that overlaps a background that is visible to the driver through the projected member, so as to be displayed in a superimposed manner as a virtual image. The measuring unit measures a luminance value of the background. The control unit determines a luminance value of the display object based on the luminance value of the background measured by the measuring unit and chromaticity values of the display object, and a sense of superimposition that is a value having a range of 0 or greater and 100 or less, and controls the projecting unit such that the display object is projected at the luminance value determined for the display object.

DESCRIPTION OF THE EMBODIMENTS

Figure 1:
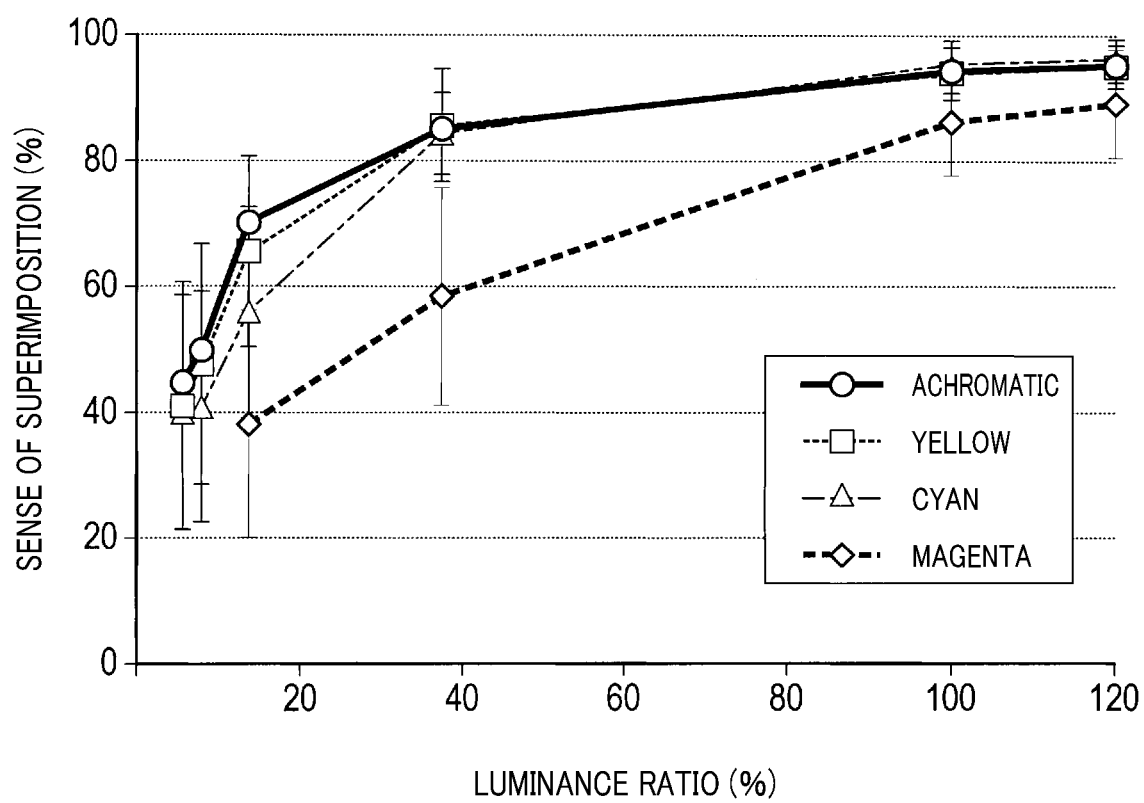
FIG. 1 is a graph of results of a human-subject experiment conducted to examine a sense of superimposition in a first embodiment.

The inventors of the present disclosure have been examining use of augmented reality (AR) in HUDs for vehicles. AR is a technology in which a display object is projected so as to be superimposed on actual scenery. As a result, visual information is presented in a manner in which the display object appears to be present in the actual scenery. For example, when a direction in which a turn is to be made at an intersection is displayed by an arrow, the arrow that serves as the display object is displayed so as to be superimposed on a road. As a result, an arrow that indicates an advancing direction of a vehicle can appear, to the driver, to be drawn on the road.

However, as a result of detailed examination by the inventors of the present disclosure, the following issue has been found. When information is displayed through AR, a sense of superimposition regarding the display object and the actual scenery decreases when visibility of the display object is unnecessarily increased.

For example, a following technology has been proposed regarding a display apparatus that is capable of being used as a head-up display (HUD) for a vehicle (for example, refer to JP-A-2004-351943). That is, in the technology, visibility of a display object is made favorable by display luminance being changed so as to track changes in peripheral illumination. When visibility of a display object is increased through use of the technology described in JP-A-2004-351943, above, the display object is, of course, made noticeable.

Therefore, for example, even in cases in which an arrow such as that described above is superimposed on the road and displayed, if visibility of the arrow is unnecessarily increased, the arrow may appear to float in a space between the road on which the arrow was originally intended to be superimposed and a visual point of the driver. That is, when an arrow that has excessively high visibility is displayed, the arrow may appear to be present in an image formation position other than a position on the road. When such a situation occurs, a position indicated by the arrow becomes difficult to ascertain. As a result, for example, the driver may erroneously recognize the arrow as instructing the driver to make a turn at an earlier point.

It is thus desired to provide a display apparatus that, when displaying a display object on an actual scenery in a superimposed manner, is capable of performing display that provides a higher sense of superimposition.

A first exemplary embodiment of the present disclosure provides a display apparatus that includes a projected member, a projecting unit, a measuring unit, and a control unit. The projected member is arranged in a direction in which a driver of a moving body looks while driving, from the perspective of the driver. The projecting unit projects at least one display object in a position that overlaps a background that is visible to the driver through the projected member, so as to be displayed in a superimposed manner as a virtual image. The measuring unit measures a luminance value of the background. The control unit determines a luminance value of the display object based on the luminance value of the background measured by the measuring unit and chromaticity values of the display object, and a sense of superimposition that is a value having a range of 0 or greater and 100 or less, and controls the projecting unit such that the display object is projected at the luminance value determined for the display object.

The control unit determines the luminance value of the display object based on the following expressions 1A and 1B:

$$\alpha = \frac{S - 29.80 \cdot x + 47.39 \cdot y - 0.67}{40.51} \quad (1A)$$

$$La = 10^\alpha \quad (1B)$$

where: La is the luminance value La of the display object; Lb is the luminance value of the background; x and y are chromaticity values of the display objects; and S is a sense of superimposition that is a value having a range of 0 or greater and 100 or less.

In the display apparatus configured in this manner, the luminance value La of the display object is determined through calculations shown in the expressions 1A and 1B, above. Therefore, even when the luminance value Lb of the background varies, the luminance value La of the display object is optimized in response. Consequently, when the display object is displayed so as to be superimposed on actual scenery, a display that provides a higher sense of superimposition can be implemented.

A second exemplary embodiment of the present disclosure provides a display apparatus that includes a projected member, a projecting unit, a measuring unit, and a control unit. The projected member is arranged in a direction in which a driver of a moving body looks while driving, from the perspective of the driver. The projecting unit projects at least one display object in a position that overlaps a background that is visible to the driver through the projected member, so as to be displayed in a superimposed manner as a virtual image. The measuring unit measures a luminance value of the background. The control unit determines a luminance value of the display object based on the luminance value of the background measured by the measuring unit and chromaticity values of the display object, and a sense of superimposition that is a value having a range of 0 or greater and 100 or less, and controls the projecting unit such that the display object is projected at the luminance value of the display object.

The control unit determines the luminance value of the display object based on the following expressions 2A and 2B:

$$\beta = \frac{S - 39.55 \cdot x - 85.85 \cdot |x - 0.32| + 67.96 \cdot y - 0.54}{40.51} \quad (2A)$$

$$La = 10^\beta \quad (2B)$$

where: La is the luminance value La of the display object; Lb is the luminance value of the background; x and y are chromaticity values of the display objects; and S is a sense of superimposition that is a value having a range of 0 or greater and 100 or less.

In the display apparatus configured in this manner, the luminance value La of the display object is determined through calculations shown in the expressions 2A and 2B, above. Therefore, even when the luminance value Lb of the background varies, the luminance value La of the display object is optimized in response. Consequently, when the display object is displayed so as to be superimposed on an actual scenery, a display that provides a higher sense of superimposition can be implemented.

Next, the display apparatus described above will be described according to exemplary embodiments.

(1) First Embodiment

[Definition and Estimation Formula for Sense of Superimposition, and Calculation Formula for Luminance Value of a Display Object]

Before the display apparatus is described, a definition of the sense of superimposition as according to the present disclosure, an estimation formula for the sense of superimposition, and a calculation formula for a luminance value of a display object will be described. In the display apparatus of the present disclosure, a display object (such as an arrow that indicates an advancing direction or a desired direction) is displayed so as to be superimposed on an actual background (such as a road) by a HUD. As a result, the display object is displayed so as to appear to be drawn on the actual background. At this time, a degree to which the display object appears to be drawn on the actual background is defined as the sense of superimposition in the present disclosure.

The following human-subject experiment was conducted. In this experiment, a display object was displayed, by a HUD, so as to be superimposed on a background (such as a gray background) that simulates a road. At this time, conditions regarding luminance and color of the display object were changed in a plurality of ways. The sense of superimposition was then examined regarding the display objects of which the conditions differ in a plurality of ways.

FIG. 1 is a graph of the results of the human-subject experiment. The graph in FIG. 1 shows a relationship between luminance ratio and the sense of superimposition. A horizontal axis indicates the luminance ratio and a vertical axis indicates the sense of superimposition. The luminance ratio is a value that is determined by expression (1.1), below. The sense of superimposition is a value that is determined by expression (1.2), below.

$$\text{Luminance ratio}(\%) = \frac{\text{Luminance value of background } Lb}{\text{Luminance value of display object } La} \times 100 \quad (1.1)$$

$$\text{Sense of superimposition}(\%) = \frac{\text{Number of times background and display object appear superimposed}}{\text{Total number of times visible}} \times 100 \quad (1.2)$$

FIG. 1 shows a graph that corresponds to cases in which the color of the display object is respectively an achromatic color, yellow, cyan, and magenta. The graph in FIG. 1 clearly indicates that, regardless of the color of the display object, the sense of superimposition tends to increase as the luminance ratio increases.

In other words, the sense of superimposition tends to increase as a luminance value La of the display object decreases. In addition, the sense of superimposition tends to be high regarding the achromatic display object, compared to the display objects of other colors, even when the luminance is high. A reason for this may be that the achromatic display object is of a similar hue to the background. It is also clear that the sense of superimposition tends to be low regarding the magenta display object, compared to the display objects of other colors (that is, achromatic, yellow, and cyan), regardless of the luminance.

It is thought that a display object that provides a high sense of superimposition in relation to the background can be displayed should the luminance value La of the display object be appropriately adjusted, taking into consideration tendencies such as those described above. Therefore, an estimation formula for the sense of superimposition S in which the luminance ratio and chromaticity values x and y of the display object are used has been generated by multiple regression analysis being performed on data acquired through the above-described human-subject experiment. The estimation formula for the sense of superimposition S is as shown in expression (1.3), below.

$$\text{Sense of superimposition } S(\%) = 17.59 \cdot \log_{10}(\text{Luminance ratio}) - 29.80 \cdot x + 47.39 \cdot y - 0.67 \quad (1.3)$$

(Coefficient of determination $R^2$: 0.92)

From the expression (1.3), above, it can be said that, to increase the sense of superimposition, the luminance ratio is preferably a large value. That is, the luminance value La of the display object is preferably lower than the luminance value Lb of the background. In addition, when the display color of the display object is expressed by the chromaticity values, x is preferably small and y is preferably large.

Therefore, it can be said that a display object that provides a high sense of superimposition in relation to the background can be displayed by, for example, when the color of the display object is determined, setting the luminance value La of the display object at which the sense of superimposition increases based on the luminance value Lb of the background and the chromaticity values x and y of the display object, and displaying the display object at such a luminance value La.

When the expression (1.1) and the expression (1.3) are arranged for the luminance value La of the display object, expressions 1A and 1B, below, can be obtained. Therefore, in the display apparatus, the luminance value La of the display object can be calculated by the calculations shown in the expressions 1A and 1B.

$$\alpha = \frac{40.51 \cdot \log_{10}(100 \cdot Lb) - S - 29.80 \cdot x + 47.39 \cdot y - 0.67}{40.51} \quad (1A)$$

$$La = 10^{\alpha} \quad (1B)$$

However, in the human-subject experiment, although it is clear that the sense of superimposition can be increased by the luminance ratio being increased, it has also become clear that, when the luminance ratio is increased, a decrease in visibility and a delay in response time tend to occur. That is, a so-called trade-off relationship is present between the sense of superimposition, and visibility and response time. Therefore, it is thought that it would not be possible to go so far as to say that the lower the luminance, the better, when various perspectives in addition to the sense of superimposition, such as visibility and response time, are also taken into consideration. For example, the extent to which the sense of superimposition is increased while ensuring visibility to a certain extent may change depending on the visual function and preference of the driver. Therefore, although described in detail hereafter, according to the present embodiment, a system in which the driver can variably set the sense of superimposition S to any of five stages is used.

[Configuration of the Display Apparatus]

Figure 2:
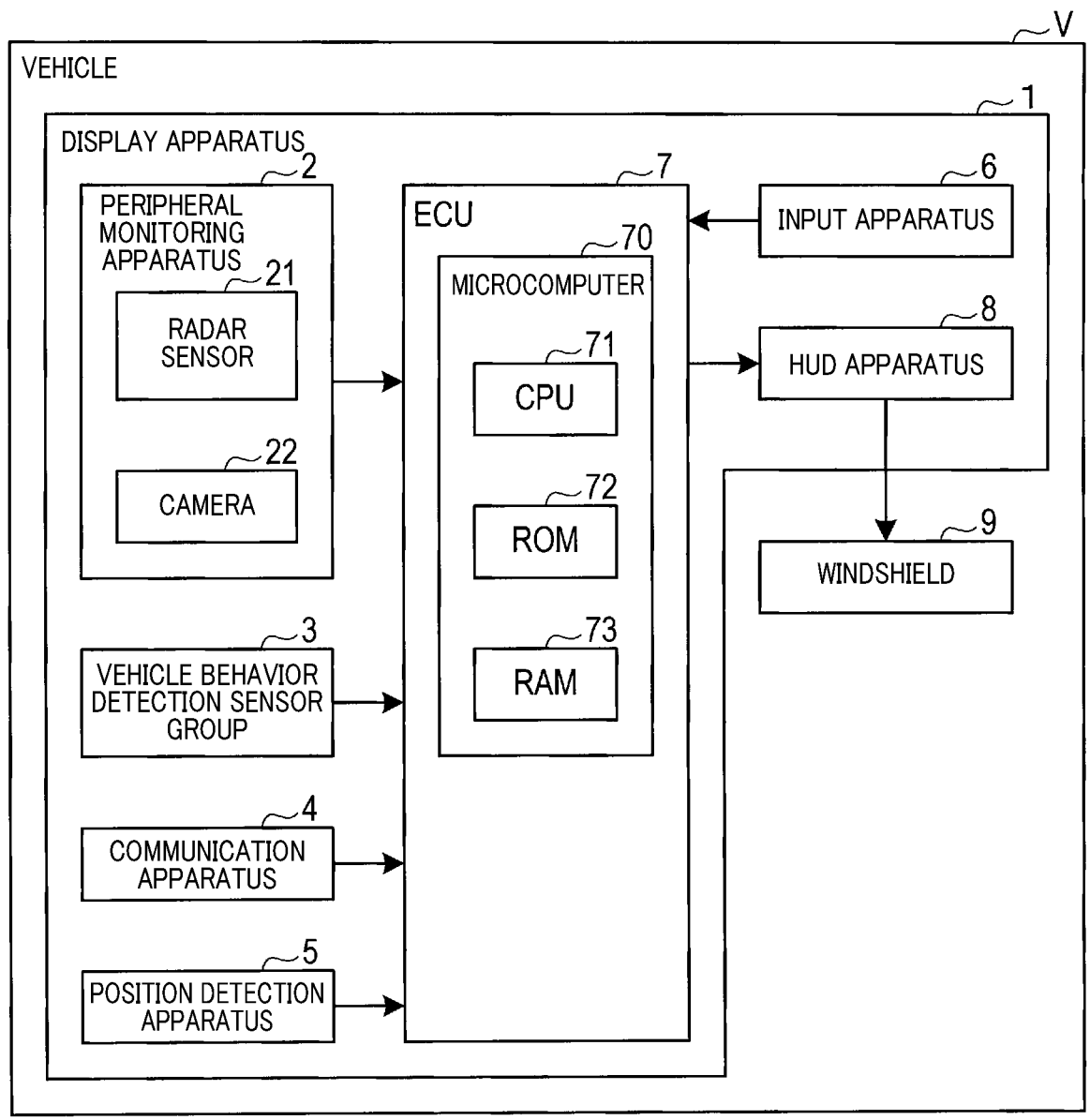
FIG. 2 is a block diagram of a configuration of a display apparatus according to the first embodiment.

Next, a configuration of the display apparatus will be described. As shown in FIG. 2, the display apparatus 1 is mounted in a vehicle V. The display apparatus 1 includes a periphery monitoring apparatus 2, a vehicle behavior detection sensor group 3, a communication apparatus 4, a position detection apparatus 5, an input apparatus 6, an electronic control unit (ECU) 7, and an HUD apparatus 8. These apparatuses that configure the display apparatus 1 transmit and receive information via an onboard local area network (LAN) (not shown).

The periphery monitoring apparatus 2 includes a radar sensor 21 and a camera 22. The radar sensor 21 uses infrared rays, millimeter waves, ultrasonic waves, or the like as radar waves and detects a distance to a target that has reflected the radar waves, a direction in which the target is present, and the like. The camera 22 is a visible light camera, an infrared camera, or the like. The periphery monitoring apparatus 2 monitors whether an obstacle is present in the periphery of the vehicle V using the radar sensor 21 and the camera 22. The periphery monitoring apparatus 2 then generates information including the position of the detected obstacle and the like.

Examples of the obstacle include various types of objects in general, such as another vehicle, a pedestrian, a building, and a fallen object. In addition, according to the present embodiment, the camera 22 is arranged in a position enabling the camera 22 to capture a background that is visible to the driver through a windshield 9. The camera 22 is capable of outputting imaging data that includes the luminance value of the background during imaging of the background. The camera 22 corresponds to a measuring unit of the present disclosure.

The vehicle behavior detection sensor group 3 includes various types of sensors that output signals indicating behavior of the vehicle. For example, such sensors include a vehicle speed sensor, an acceleration sensor, a yaw rate sensor, and a steering angle sensor.

The communication apparatus 4 acquires various types of information that affect driving action through road-vehicle communication and inter-vehicle communication.

The position detection apparatus 5 generates positional information for identifying a current position of the vehicle V. For example, the position detection apparatus 5 includes a global navigation satellite system (GNSS) receiver, a gyroscope, a distance senor, and the like. The GNSS receiver receives transmission signals from an artificial satellite and detects positional coordinates and an altitude of the vehicle V. The gyroscope outputs a detection signal that is based on an angular velocity of a rotational motion applied to the vehicle V. The distance sensor outputs a traveling distance of the vehicle V. The position detection apparatus 5 determines the current position of the vehicle V based on the output signals from these apparatuses.

The input apparatus 6 is arranged in a vehicle cabin, in a position enabling operation by the driver. According to the present embodiment, when the driver is to change a setting value of the sense of superimposition S, the driver operates the input apparatus 6 and changes the setting value of the sense of superimposition S. According to the present embodiment, the setting value of the sense of superimposition S can be changed to any of five levels: 60%, 70%, 80%, 90% and 100%. The input apparatus 6 corresponds to a setting unit of the present disclosure.

The HUD apparatus 8 is configured to be capable of projecting at least one display object in a position that overlaps the background that is visible by the driver through the windshield 9, such that the display object is displayed in a superimposed manner as a virtual image. The display object that is projected by the HUD apparatus 8 is visible to the driver so as to be present in a position farther ahead of the windshield 9. The HUD apparatus 8 corresponds to a projecting unit of the present disclosure.

The ECU 7 includes a microcomputer 70. The microcomputer 70 includes a central processing unit (CPU) 71, a read-only memory (ROM) 72, and a random access memory (RAM) 73. Each section of the display apparatus 1 is controlled by the CPU 71 performing a process based on a program recorded in a recording medium such as the ROM 72. A backup RAM is included in a portion of the RAM 73. The backup RAM is capable of holding stored content using electric power supplied from a battery that is provided in the ECU 7, even when power supply to the ECU 7 is stopped. The backup RAM stores therein the setting value of the sense of superimposition S and the like.

The ECU 7 performs various processes including an obstacle detecting process, a notification information generating process, and a display control process, and the like. In the obstacle detecting process, the ECU 7 detects various obstacles based on information from the periphery monitoring apparatus 2. In the notification information generating process, the ECU 7 generates notification information of which notification is given via the HUD apparatus 8, under a condition set in advance, based on the detection results of the obstacle detecting process and information acquired from the vehicle behavior detection sensor group 3, the communication apparatus 4, and the position detection apparatus 5.

In the display control process, the ECU 7 controls the HUD apparatus 8 such that the notification information that has been generated in the notification information generating process is projected onto the windshield 9 as the display object. The display control process includes a luminance control process in which luminance of the display object projected by the HUD apparatus 8 is controlled. The ECU 7 corresponds to a control unit of the present disclosure.

[Luminance Control Process]

Next, the luminance control process performed by the ECU 7 will be described based on a flowchart in FIG. 3. The ECU 7 repeatedly performs the luminance control process when the display object is displayed by the HUD apparatus 8. When the luminance control process is started, at step S10, the ECU 7 determines whether a predetermined amount of time has elapsed after an update of the luminance of the display object. The luminance of the display object is updated at step S60, described hereafter. At step S10, the ECU 7 determines whether the predetermined amount of time (such as 0.5 seconds) has elapsed from the time at which step S60 has been performed, with reference to this time.

When determined that the predetermined amount of time has not elapsed at step S10, the ECU 7 returns to step S10. Therefore, the ECU 7 repeatedly performs the determination at step S10 until the predetermined amount of time elapses. Meanwhile, when determined that the predetermined amount of time has elapsed at step S10, the ECU 7 proceeds to step S20. At step S20, the ECU 7 identifies an area in a camera image that is captured by the camera 22 in which the display object to be displayed by the HUD apparatus 8 is to be displayed in a superimposed manner.

The camera image that is captured by the camera 22 is an image of the background that is visible to the driver through the windshield 9. An imaging area of the camera 22 and a display area of the HUD apparatus 8 are both determined in advance. An area in which the two areas overlap is also determined in advance. Therefore, when the position in which the display object is to be displayed in the display area of the HUD apparatus 8 is determined, the area in which the display object is to be displayed in a superimposed manner (hereafter referred to as a superimposed-display area) can be identified in the camera image.

The display object is configured by a plurality of pixels that are vertically and horizontally arrayed. The superimposed-display area is identified as a rectangular area in which a number of pixels in a lateral direction coincides with a maximum number of pixels of the display object in the lateral direction and a number of pixels in a vertical direction coincides with a maximum number of pixels of the display object in the vertical direction. When a plurality of display objects are displayed, a plurality of superimposed-display areas that correspond to the plurality of display objects are identified.

In this case, the number of pixels in the lateral direction and the number of pixels in the vertical direction of each of the plurality of superimposed-display areas are determined based on the numbers of pixels in the lateral direction and the number of pixels the vertical direction of the display object that is displayed in each superimposed-display area.

Next, at step S30, the ECU 7 calculates a luminance value Lb of the background. According to the present embodiment, the above-described camera image is configured by a plurality of pixels that are horizontally and vertically arrayed. Each pixel has a luminance value. At step S30, regarding the superimposed-display area identified at step S20, the ECU 7 calculates an average value of the luminance values of the plurality of pixels that are included in the superimposed-display area. The ECU 7 then sets the average value as the luminance value Lb of the background. When a plurality of display objects are displayed, the ECU 7 calculates the luminance value Lb of the background for each of the superimposed-display areas that respectively display the plurality of display objects.

Next, at step S40, the ECU 7 acquires the setting value of the sense of superimposition S set by the driver. The setting value of the sense of superimposition S is a value that is set by the driver operating the input apparatus 6. The setting value of the sense of imposition S is stored in the RAM 73. Therefore, at step S40, the ECU 7 reads the setting value of the sense of superimposition S from the RAM 73.

Next, at step S50, the ECU 7 calculates the luminance value La of the display object based on the luminance value Lb of the background, the chromaticity values x and y of the display object, and the setting value of the sense of superimposition S. The luminance value La of the display object is calculated by the expression 1A and the expression 1B, above. When a plurality of display objects are displayed, the ECU 7 calculates the luminance value La for each display object, using the luminance value Lb of the background, and the chromaticity values x and v corresponding to each of the plurality of display objects.

Next, at step S60, the ECU 7 updates the luminance of the display object to the luminance value La calculated at step S50. As a result, the display object is displayed so as to be superimposed on the background at the luminance value La at which the sense of superimposition corresponding to the setting value of the sense of superimposition S is achieved, based on the newest luminance value Lb of the background.

Figure 4:
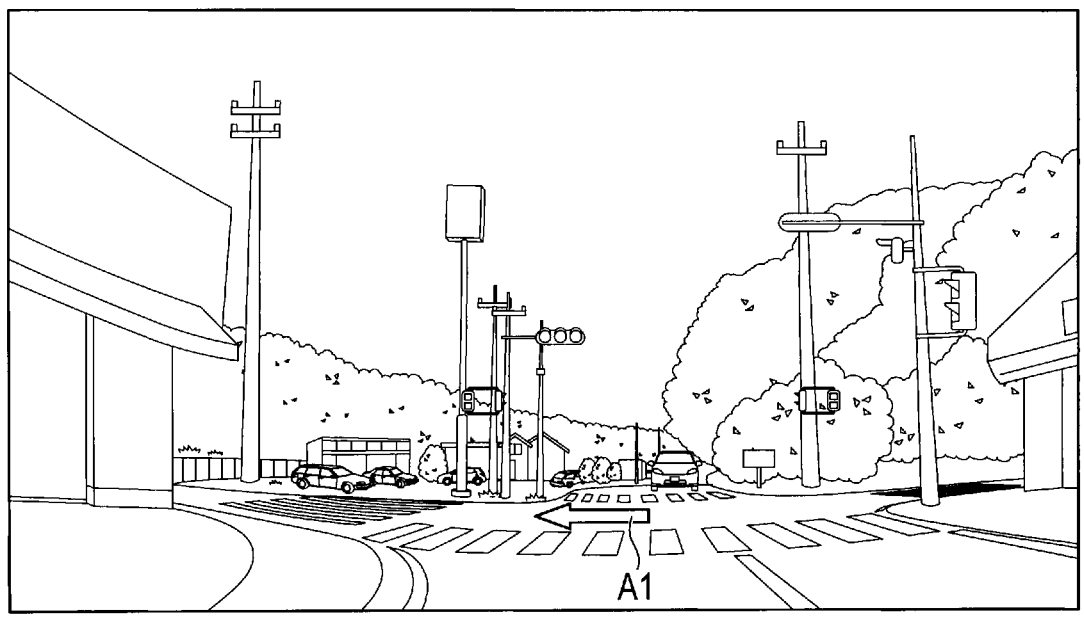
FIG. 4 is an explanatory diagram of an example in which an advancing direction of a vehicle is indicated by an arrow in the first embodiment.

For example, as shown in FIG. 4, when the advancing direction of the vehicle at an intersection is indicated by an arrow A1, the arrow A1 is displayed at the luminance value La calculated at step S50. As a result, the arrow A1 can be displayed at the luminance value La at which the sense of superimposition S set by the driver themselves can be achieved. Here, the ECU 7 returns to step S10 after completing step S60. As a result, the ECU 7 subsequently repeatedly performs the processes from steps S20 to S60 each time the predetermined amount of time is determined to have elapsed at step S10.

[Control Taking into Consideration Chromaticity of the Background]

In the example above, the luminance La of the display object is controlled taking into consideration the luminance Lb of the background. However, control may be performed so as to further take into consideration the chromaticity of the background.

Figure 5:
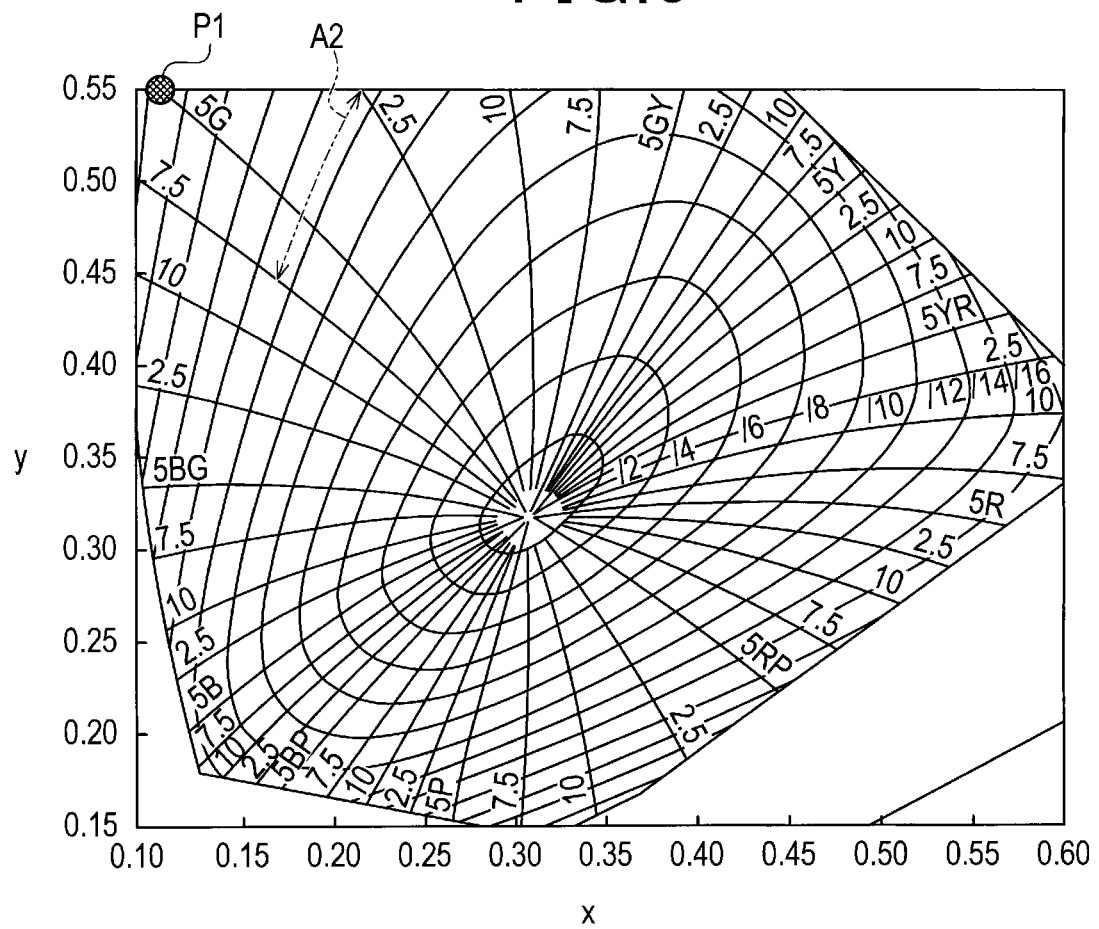
FIG. 5 is an xy chromaticity diagram for explaining a method for determining chromaticity of a display object that provides a high sense of superimposition based on chromaticity of a background in the first embodiment.

For example, in a method similar to that in the case of the luminance of the background, described above, a case in which the chromaticity values of the background in the superimposed-display area are the chromaticity values x=0.0908 and y=0.5695 indicated by a point P1 on an xy chromaticity diagram shown in FIG. 5 is assumed. In this case, the hue of the background is 5G in the Munsell color system. Therefore, as a result of the hue of the display object being controlled to a similar hue, the sense of superimposition can be increased.

Here, for example, similar hues may be defined as a range of hues that include the hue that is identical to the hue of the background and hues that are immediately adjacent thereto in the Munsell color system. When the hue of the background corresponds to 5G in the Munsell color system as in the example described above, hues including 2.5G, 5G, and 7.5G (that is, a range indicated by a double-ended arrow A2 in FIG. 5) can be defined as similar hues. When the hue of the background is 2.5G, 5G, and 7.5G, the chromaticity values x and y are respectively (i) x=0.1145 and y=0.7122 in 2.5G, (ii) x=0.0908 and y=0.5695 in 5.0G, and (iii) x=0.0858 and y=0.5127 in 7.5G. Therefore, when the hue of the background is 5G, if the chromaticity of the display object is set within a range of x=0.0858 to 0.1145 and y=0.5127 to 0.7122, the sense of superimposition can be increased.

[Effects]

In the display apparatus 1 described above, the ECU 7 determines the luminance value La of the display object to be projected by the HUD apparatus 8 through the calculations shown in the expression 1A and the expression 1B, above. Therefore, even when the luminance value Lb of the background varies, the luminance value La of the display object is optimized in response. Therefore, when the display object is displayed so as to be superimposed on an actual scenery, a display that provides a higher sense of superimposition can be implemented.

In addition, according to the present embodiment, when determining the luminance La of the display object projected by the HUD apparatus 8, the ECU 7 determines the luminance La of the display object based on the sense of superimposition S set through the input apparatus 6. Therefore, a balance between the extent of the sense of superimposition and the extent of visibility can be arbitrarily adjusted based on the preference of the driver.

Furthermore, according to the present embodiment, when a plurality of display objects are projected by the HUD apparatus 8, the ECU 7 determines the luminance value La of the display object for each of the plurality of display objects. Therefore, even when the chromaticity of the display object differs among the plurality of display objects, the sense of superimposition of the display objects can be optimized based on the differences therebetween.

In addition, according to the present embodiment, when determining the luminance value La of each of the plurality of display object, the ECU 7 acquires the luminance value Lb of the background measured by the camera 22 for each of the superimposed-display areas in which the plurality of display objects are displayed. Therefore, even when the luminance value Lb of the background differs among the plurality of display objects, the sense of superimposition of the display objects can be optimized based on the differences therebetween.

(2) Second Embodiment

Next, a second embodiment will be described. Here, according to the second embodiment, only a part of the configuration described according to the first embodiment is changed. Therefore, differences with the first embodiment will mainly be described in detail. Detailed descriptions of sections that are similar to those according to the first embodiment are omitted.

The display apparatus 1 according to the second embodiment is configured as shown in FIG. 2. The display apparatus 1 according to the second embodiment is identical to the display apparatus 1 according to the first embodiment in this regard. However, according to the second embodiment, an estimation formula for the sense of superimposition S, as shown in expression (2.3), below, in which the luminance ratio and the chromaticity values x and y of the display object are used is generated by multiple regression analysis being performed on data acquired through a human-subject experiment identical to that according to the first embodiment.

$$\text{Sense of superimposition } S(\%) = 40.92 \cdot \log_{10}(\text{Luminance ratio}) - 39.55 \cdot x - 85.85 \sim |x - 0.32| + 67.96 \cdot y - 0.54 \quad (2.3)$$

(Coefficient of determination $R^2$: 0.94)

When the expression (1.1) according to the first embodiment and the expression (2.3), above, are arranged for the luminance value La of the display object, expressions 2A and 2B, below, can be obtained. Therefore, in the display apparatus 1 according to the second embodiment, the luminance value La of the display object is calculated through calculations shown in the expressions 2A and 2B.

$$\beta = \frac{40.92 \cdot \log_{10}(100 \cdot Lb) - S - 39.55 \cdot x - 85.85 \cdot |x - 0.32| + 67.96 \cdot y - 0.54}{40.51} \quad (2A)$$

$$La = 10^{\beta} \quad (2B)$$

Figure 3:
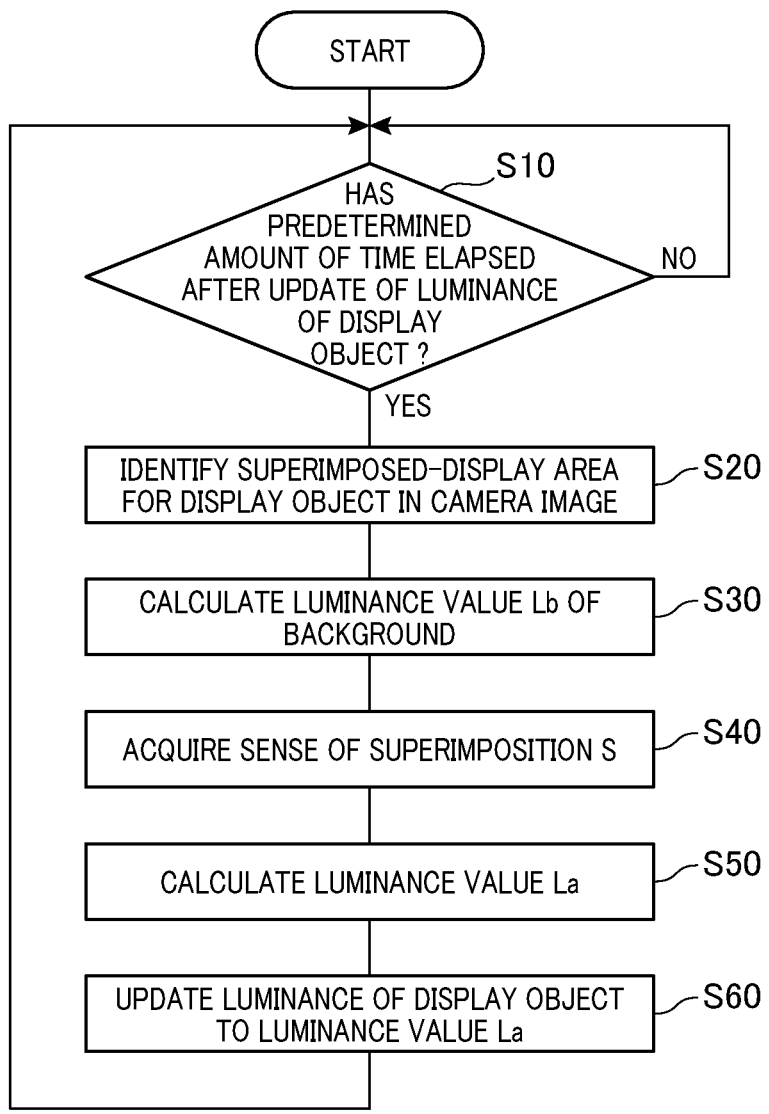
FIG. 3 is a flowchart of a luminance control process performed in the first embodiment.

Here, the luminance control process shown in FIG. 3 is performed in the display apparatus 1 according to the second embodiment as well. At this time, at step S50, the ECU 7 calculates the luminance value La of the display object using the expression 2A and the expression 2B, above, based on the luminance value Lb of the background, the chromaticity values x and y of the display object, and the setting value of the sense of superimposition S.

Therefore, in the display apparatus 1 according to the second embodiment as well, effects similar to those of the display apparatus 1 according to the first embodiment can be achieved. That is, in the display apparatus 1 according to the second embodiment as well, when the luminance value Lb of the background varies, the luminance value La of the display object is optimized in response. Therefore, when the display object is displayed so as to be superimposed on an actual scenery, a display that provides a higher sense of superimposition can be implemented.

(3) Other Embodiments

The display apparatus according to exemplary embodiments are described above. However, the above-described embodiments are merely given as examples of aspects of the present disclosure. That is, the present disclosure is not limited to the above-described exemplary embodiments. Various embodiments are possible without departing from the technical ideas of the present disclosure.

For example, according to the above-described embodiments, the arrow A1 shown in FIG. 4 is given as an example of the display object that is displayed by the HUD apparatus 8. However, various types of display objects can be considered. For example, in the above-described display apparatus 1, whether an obstacle is present in the periphery of the vehicle V and the like are monitored by the periphery monitoring apparatus 2. Information including the position of the detected obstacle and the like are generated. Therefore, the above-described luminance control process may be performed when an arrow or a frame that indicates the presence of the obstacle is displayed by the HUD apparatus 8.

In addition, according to the above-described embodiments, the HUD apparatus 8 is configured to project the display object onto the windshield 9. However, the HUD apparatus 8 may project the display object onto a projected member other than the windshield 9. For example, a combiner may be arranged in front of the windshield 9. The HUD apparatus 8 may project the display object onto the combiner. The windshield 9 and the combiner correspond to a projected member of the present disclosure.

In addition to the foregoing, a function that is implemented by a single constituent element according to the above-described embodiments may be implemented by a plurality of constituent elements. Furthermore, functions that are implemented by a plurality of constituent elements may be implemented by a single constituent element. Moreover, a part of a configuration according to the above-described embodiments may be omitted. In addition, at least a part of a configuration according to an above-described embodiment may be added to or replace a configuration according to another of the above-described embodiments.

(4) Supplementation

Here, as is clear according to the exemplary embodiments described above, the display apparatus of the present disclosure may further include configurations such as those described below.

According to an aspect of the present disclosure, a setting unit that sets a value that is included within a range of 0 or greater and 100 or less, and is determined based on an operation by the driver as the value of the sense of superimposition S may be included. The control unit may determine the luminance value La of the display object based on the sense of superimposition S set by the setting unit.

According to an aspect of the present disclosure, when a plurality of display objects are projected by the projecting unit, the control unit may determine the luminance value La of the display object for each of the plurality of display objects.

According to an aspect of the present disclosure, when determining the luminance value La for each of the plurality of display objects, the control unit may acquire the luminance value Lb of the background measured by the measuring unit for each of the areas in which the plurality of display objects are displayed.

What is claimed is:

1. A display apparatus comprising:
a projected member that is arranged in a direction in which a driver of a moving body looks while driving, from a perspective of the driver;
a projecting unit that projects at least one display object in a position that overlaps a background that is visible to the driver through the projected member, so as to be displayed in a superimposed manner as a virtual image;
a measuring unit that measures a luminance value of the background; and
a control unit that determines a luminance value of the at least one display object based on the luminance value of the background measured by the measuring unit, chromaticity values of the at least one display object, and a sense of superimposition that is a value having a range of 0 or greater and 100 or less, and controls the projecting unit such that the at least one display object is projected at the luminance value of the at least one display object, wherein
the control unit determines the luminance value of the at least one display object based on the following expressions 1A and 1B:

$$\alpha = \frac{40.51 \cdot \log_{10}(100 \cdot Lb) - S - 29.80 \cdot x + 47.39 \cdot y - 0.67}{40.51} \quad (1A)$$

$$La = 10^\alpha \quad (1B)$$

where: La is the luminance value of the at least one display object; Lb is the luminance value of the background; x and y are chromaticity values of the at least one display object; and S is a sense of superimposition that is a value having a range of 0 or greater and 100 or less.

2. The display apparatus according to claim 1, further comprising:
a setting unit that sets, as a value of the sense of superimposition, a value that is included within a range of 0 or greater and 100 or less, and is determined by an operation by the driver, wherein
the control unit determines the luminance value of the at least one display object based on the sense of superimposition set by the setting unit.

3. The display apparatus according to claim 1, wherein:
when a plurality of display objects are projected by the projecting unit, the control unit determines the luminance value of a display object for each of the plurality of display objects.

4. The display apparatus according to claim 3, wherein:
when determining the luminance value for each of the plurality of display objects, the control unit acquires the luminance value of the background measured by the measuring unit for each of areas in which the plurality of display objects are displayed.

5. A display apparatus comprising:
a projected member that is arranged in a direction in which a driver of a moving body looks while driving, from a perspective of the driver;
a projecting unit that projects at least one display object in a position that overlaps a background that is visible to the driver through the projected member, so as to be displayed in a superimposed manner as a virtual image;
a measuring unit that measures a luminance value of the background; and
a control unit that determines a luminance value of the at least one display object based on the luminance value of the background measured by the measuring unit, chromaticity values of the at least one display object, and a sense of superimposition that is a value having a range of 0 or greater and 100 or less, and controls the projecting unit such that the at least one display object is projected at the luminance value of the at least on display object, wherein
the control unit determines the luminance value of the at least one display object based on the following expressions 2A and 2B:

$$\beta = \frac{40.92 \cdot \log_{10}(100 \cdot Lb) - S - 39.55 \cdot x - 85.85 \cdot |x - 0.32| + 67.96 \cdot y - 0.54}{40.51} \quad (2A)$$

$$La = 10^\beta \quad (2B)$$

where: La is the luminance value of the at least one display object; Lb is the luminance value of the background; x and y are chromaticity values of the at least one display object; and S is a sense of superimposition S that is a value having a range of 0 or greater and 100 or less.

6. The display apparatus according to claim 5, further comprising:
a setting unit that sets as a value of the sense of superimposition, a value that is included within a range of 0 or greater and 100 or less, and is determined by an operation by the driver, wherein
the control unit determines the luminance value of the at least one display object based on the sense of superimposition set by the setting unit.

7. The display apparatus according to claim 5, wherein:
when a plurality of display objects are projected by the projecting unit, the control unit determines the luminance value of a display object for each of the plurality of display objects.

8. The display apparatus according to claim 7, wherein:
when determining the luminance value for each of the plurality of display objects, the control unit acquires the luminance value of the background measured by the measuring unit for each of areas in which the plurality of display objects are displayed.

9. A control method for a display apparatus,
the display apparatus comprising:
a projected member that is arranged in a direction in which a driver of a moving body looks while driving, from a perspective of the driver;
a projecting unit that projects at least one display object in a position that overlaps a background that is visible to the driver through the projected member, so as to be displayed in a superimposed manner as a virtual image; and
a measuring unit that measures a luminance value of the background,
the control method comprising:
determining a luminance value of the at least one display object based on the luminance value of the background measured by the measuring unit, chromaticity values of the at least one display object, and a sense of superimposition that is a value having a range of 0 or greater and 100 or less; and
controlling the projecting unit such that the at least one display object is projected at the luminance value of the at least one display object, wherein
the determining step comprises
determining the luminance value of the display object based on the following expressions 1A and 1B:

$$\alpha = \frac{40.51 \cdot \log_{10}(100 \cdot Lb) - S - 29.80 \cdot x + 47.39 \cdot y - 0.67}{40.51} \quad (1A)$$

$$La = 10^\alpha \quad (1B)$$

where: La is the luminance value of the at least one display object; Lb is the luminance value of the background; x and y are chromaticity values of the at least one display object; and S is a sense of superimposition S that is a value having a range of 0 or greater and 100 or less.

10. A control method for a display apparatus,
the display apparatus comprising:
a projected member that is arranged in a direction in which a driver of a moving body looks while driving, from a perspective of the driver;
a projecting unit that projects at least one display object in a position that overlaps a background that is visible to the driver through the projected member, so as to be displayed in a superimposed manner as a virtual image; and
a measuring unit that measures a luminance value of the background,
the control method comprising:
determining a luminance value of the at least one display object based on the luminance value of the background measured by the measuring unit, chromaticity values of the at least one display object, and a sense of superimposition that is a value having a range of 0 or greater and 100 or less; and
controlling the projecting unit such that the at least one display object is projected at the luminance value of the at lease one display object, wherein
the determining step comprises
determining the luminance value of the at least one display object based on the following expressions 2A and 2B:

$$\beta = \frac{40.92 \cdot \log_{10}(100 \cdot Lb) - S - 39.55 \cdot x - 85.85 \cdot |x - 0.32| + 67.96 \cdot y - 0.54}{40.51} \quad (2A)$$

$$La = 10^\beta \quad (2B)$$

where: La is the luminance value of the at least one display object; Lb is the luminance value of the background; x and y are chromaticity values of the at least one display object; and S is a sense of superimposition S that is a value having a range of 0 or greater and 100 or less.

* * * * *